United States Patent [19]
Jargon et al.

[11] Patent Number: 6,016,240
[45] Date of Patent: Jan. 18, 2000

[54] DISK HEAD POSITIONING SYSTEM INCLUDING LIFT WING EXTENSIONS ON THE ACTUATOR AND A PIVOTING LATCH

[75] Inventors: Jonathan David Jargon; Paul Andrew Wenker; Kenneth Hudson Fernalld, all of Boulder; James Harold Bodmer, Longmont; David William Paquet, Louisville, all of Colo.

[73] Assignee: O.R. Technology, Inc., Boulder, Colo.

[21] Appl. No.: 09/057,294

[22] Filed: Apr. 8, 1998

[51] Int. Cl.[7] ...................................................... G11B 5/54
[52] U.S. Cl. ............................................ 360/105; 369/249
[58] Field of Search ............................ 360/99.02, 99.06, 360/105, 106; 369/77.1, 77.2, 244, 249

[56] References Cited

U.S. PATENT DOCUMENTS

| | | | |
|---|---|---|---|
| 4,206,489 | 6/1980 | Manzke et al. | 360/105 |
| 4,636,896 | 1/1987 | Takikawa . | |
| 4,651,244 | 3/1987 | Yano . | |
| 4,663,682 | 5/1987 | McNeil | 360/105 |
| 4,763,213 | 8/1988 | Muroyama . | |
| 4,807,068 | 2/1989 | Shiraishi . | |
| 5,060,101 | 10/1991 | Isomura . | |
| 5,278,819 | 1/1994 | Shimegi et al. . | |
| 5,291,361 | 3/1994 | Yokota | 360/106 |
| 5,303,102 | 4/1994 | Aruga et al. . | |
| 5,396,385 | 3/1995 | Tangi et al. | 360/105 |
| 5,404,257 | 4/1995 | Alt | 360/105 |
| 5,530,607 | 6/1996 | Spendlove | 360/105 |
| 5,650,891 | 7/1997 | Thayne et al. | 360/99.06 |
| 5,742,454 | 4/1998 | Vera et al. | 360/105 |
| 5,831,789 | 11/1998 | Nishikawa | 360/99.02 |

*Primary Examiner*—Brian E. Miller
*Attorney, Agent, or Firm*—Thomas E. Schatzel; Law Offices of Thomas E. Schatzel, A Prof. Corp.

[57] ABSTRACT

A mechanical linkage within a computer disk drive is used to ensure that the disk drive heads are parked prior to diskette ejection. An eject frame moves with respect to the chassis and drives a latch in an arcuate path. The latch engages an actuator and drives the actuator to an inner diameter position. The mechanical linkage ensures that the actuator is captured in its parked position whenever the eject frame is in an ejected position. The latch is returned to a stowed position when a diskette is installed in the disk drive. The mechanical linkage protects the heads by ensuring proper clearances from the diskette, and by positioning the actuator in a structurally rigid portion of the receiver plate. The invention has particular applicability to disk drives for portable computers.

6 Claims, 10 Drawing Sheets

DISK HEAD POSITIONING SYSTEM INCLUDING LIFT WING EXTENSIONS ON THE ACTUATOR AND A PIVOTING LATCH

1. Field of the Invention

The present invention relates to a computer disk drive with a mechanism for protecting read/write heads and, more particularly, to a mechanism that can mechanically position the actuator, including the heads, prior to ejecting a diskette for the purpose of protecting the heads against mechanical shock and vibration.

2. Background of the Invention

Disk drive read/write heads (also known as transducers, or heads) are typically fragile devices that should be protected against collisions with any other internal structures in the disk drive. There are typically upper and lower heads that face each other on opposite sides of a recording disk. The heads are particularly vulnerable in the absence of a diskette installed in the disk drive, because a mechanical shock or jolt to the drive could cause the heads to bump into each other. The heads are also vulnerable during diskette load/unload operations. There must be sufficient clearance to prevent the diskette from scraping against the head as the diskette is inserted or removed from the drive. Damage to the heads can be prevented in each instance by properly positioning the heads at a safe location. This is commonly known as "parking" the heads.

Protecting the heads becomes increasingly difficult as disk drives become smaller. Prior designs for disk drives had mechanical linkages for parking the heads, and these linkages will not necessarily fit within the compact spaces of newer disk drives. For example, many small disk drives do not have space in which to position mechanical linkages above or below the heads.

These problems become exacerbated for disk drives that must be able to withstand the environmental conditions of portable computers, including mechanical shocks from bumping or dropping the computer. Disk drives for portable computers must also be capable of parking the heads after a power shutdown, since batteries for portable computers may run down unexpectedly. Thus, the ideal disk head parking mechanism for portable computers is small, shock resistant, and mechanically operated. This set of requirements presents a significant challenge to disk drive manufacturers.

The problem of protecting the heads is most acute when there is no diskette within the disk drive. When no diskette is present, the upper and lower heads are exposed within the disk drive. It is typical to have the upper head mounted on a flexible or movable support so that a diskette can be inserted between the heads. Thus, a mechanical shock to the disk drive might cause the support to move or flex far enough to bump the heads against each other. In contrast, when a diskette is installed in the disk drive, the recording medium separates the upper and lower heads, and the flexible support is typically clamped downward to press the head against the disk. Accordingly, it would be advantageous for disk drives to have a mechanism capable of protecting the heads while no diskette is installed.

During read/write operations, the heads are typically held against opposing sides of the recording medium. Insertion or removal of a diskette while the heads are in a read/write configuration can destroy the heads. In addition, the heads must be separated far enough from the diskette to prevent accidental contact between the heads and the diskette cartridge or shutter. Accordingly, it would also be advantageous to have a mechanism that provides appropriate clearances between the heads and the diskette prior to insertion or removal of the diskette.

Software controls can be effective in most cases to command the heads into an appropriate protective location prior to insertion or removal of a diskette. For example, it is typical to have a small positioning motor that can be controlled by software or firmware within the disk drive to ensure that the heads are properly positioned prior to a diskette eject operation. However, it is necessary to design disk drives to accommodate the contingency wherein a diskette must be removed manually and without software control. For example, the increasing popularity of small, battery powered computers has led to numerous occasions where battery power has run out, and users wish to manually remove diskettes. It would be advantageous to have a mechanism that provides appropriate protection for the heads, without the need for electrical power or software control.

One of the problems associated with mechanical linkages within disk drives is that motors within the disk drives must be sized and powered to drive the linkages. For example, many disk drives have eject motors that drive a diskette eject mechanism. A linkage that is attached to the actuator and the eject mechanism will place an additional load of the eject motor. This will cause the eject motor to consume additional electrical power, leading to shorter battery life within the computer. Computer manufacturers prefer to have disk drives that consume a minimum amount of electrical power. Thus, it would be desirable to have a manually driven mechanism that can protect the heads, as described above, with the further quality that minimal additional load is placed on the motors within the disk drive.

The prior art depicts various solutions for protecting disk drive heads, as follows:

U.S. Pat. No. 4,651,244 discloses a device comprising a cam for coupling and decoupling magnetic heads relative to a flexible disk. The cam is mounted between two structural elements containing the heads. As the cam rotates, the structural elements are forced apart from each other to separate the heads.

U.S. Pat. No. 4,636,896 discloses a recording and playback apparatus having a magnetic head separation device. When a diskette is not inserted, the magnetic head is positioned away from the operative position by a bail disposed by a cam. When a diskette is inserted, the cam is actuated to release the bail.

U.S. Pat. No. 4,763,213 discloses a disk drive having a mechanism for preventing the heads from coming into contact with each other. The mechanism is interlinked with a manually operated lever for moving the heads against the recording medium. A member attached to the recording head is lifted to thereby separate the heads.

U.S. Pat. No. 4,807,068 discloses an eject mechanism for a disk drive having an apparatus for preventing accidental head lowering. An arm is attached to the upper head and is engaged by a support member. An ejector causes the support member to hold the arm in an upper position when a diskette clamping operation is performed without insertion of a diskette.

U.S. Pat. No. 5,060,101 discloses a disk drive having a lock system. At least one head is mounted on a movable carriage driven by a linear actuator. The carriage is locked in place when the linear actuator becomes inoperative.

U.S. Pat. No. 5,278,819 discloses a disk storage device having a carriage locking mechanism. A mechanism moves the diskette into an eject position in response to the operation of an eject member. A lock member cooperates with the mechanism for keeping the head part stationary at the eject position.

U.S. Pat. No. 5,303,102 discloses a disk drive apparatus having a head guard. The head guard is movable between a guarding position and a withdrawn position. In the guarding position, the head guard is inserted between the heads to prevent the heads from abutting each other.

However, the prior art does not provide a simple, compact mechanism for protecting disk drive heads that has the advantages of the present invention.

SUMMARY OF THE INVENTION

The present invention is a disk drive with a mechanism that protects the heads against structural damage and insures that the actuator is parked prior to diskette ejection. The disk drive comprises a chassis, an eject frame, a receiver element, an actuator, and a movable latch. The chassis supports a spindle motor for rotating a disk loaded into the disk drive. The eject frame is slidably mounted to the chassis, and also supports the receiver element. The combination of the eject frame and the receiver element act as a load/unload mechanism. The heads are located on an actuator that can move through a defined stroke with respect to the chassis. The actuator has a surface that is designed to engage a latch. If the actuator is not in the correct position to eject a diskette, the eject frame drives the latch against the surface to force the actuator into a parked position. The mechanical interaction between the latch and the actuator insures that the actuator will be properly positioned to protect the heads.

One advantage of the present invention is that the disk heads are protected against structural damage due to shock or vibration.

Another advantage is that the actuator can be mechanically driven to a safe position without need for electrical power or firmware control.

Another advantage is that the mechanical linkage does not add a significant mechanical load to the eject motor.

Another advantage is that the actuator is mechanically captured in a protective position until a diskette is installed in the disk drive.

Another advantage is that the protective mechanism can fit into a small space that is suitable for portable disk drives.

These advantages, and other advantages not specifically enumerated, will become apparent to those having skill in the appertaining art after reviewing the drawings and the detailed description that follows.

DETAILED DESCRIPTION OF THE INVENTION

Figure 1:
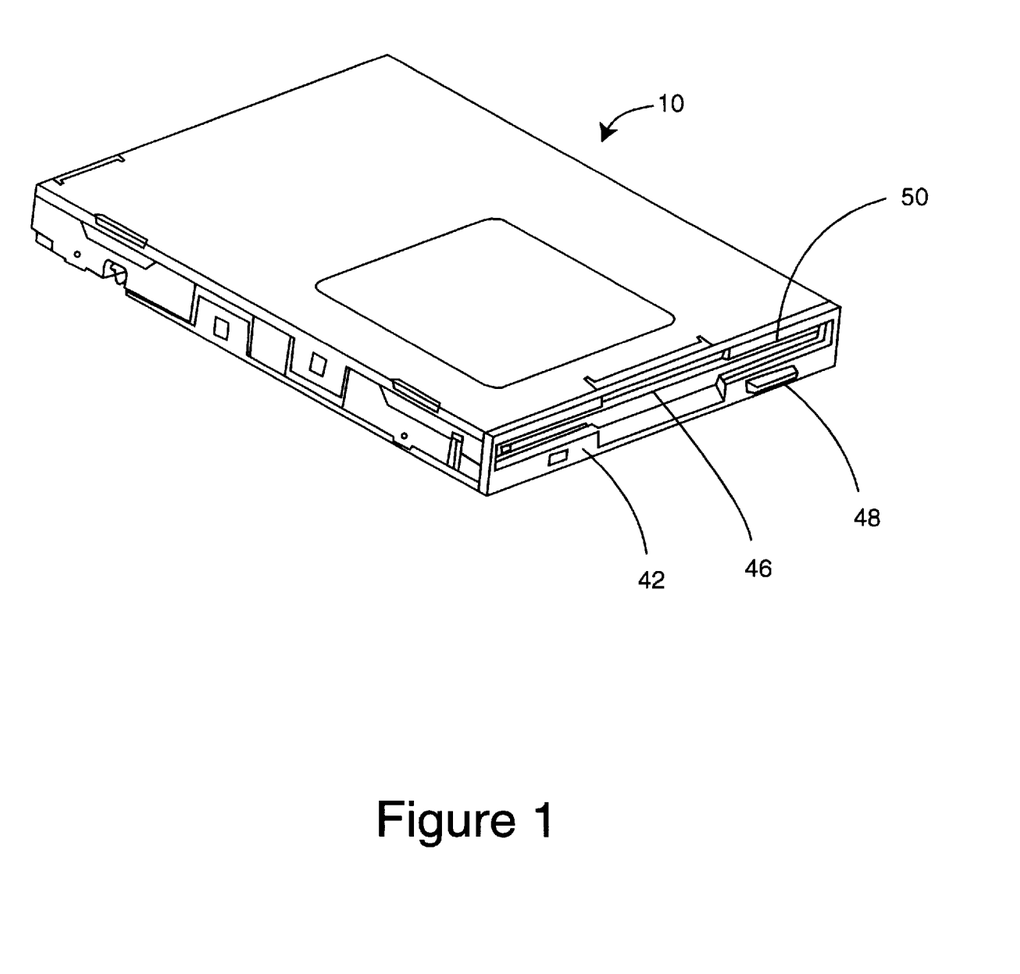
FIG. 1 is a perspective view of a disk drive assembly according to the present invention, showing the front panel and aperture for insertion and removal of a diskette.

FIG. 1 shows a disk drive 10 having a front panel 42 and an aperture 46 through which a diskette 18 can be inserted. An eject button 48 is located on the front panel 42 for initiating motorized ejection of the diskette 18. In the event that electrical power is not available to the disk drive 10, an access port 50 on the front panel 42 allows for insertion of a paper clip or other small tool for manually ejecting the diskette 18.

Figure 2:
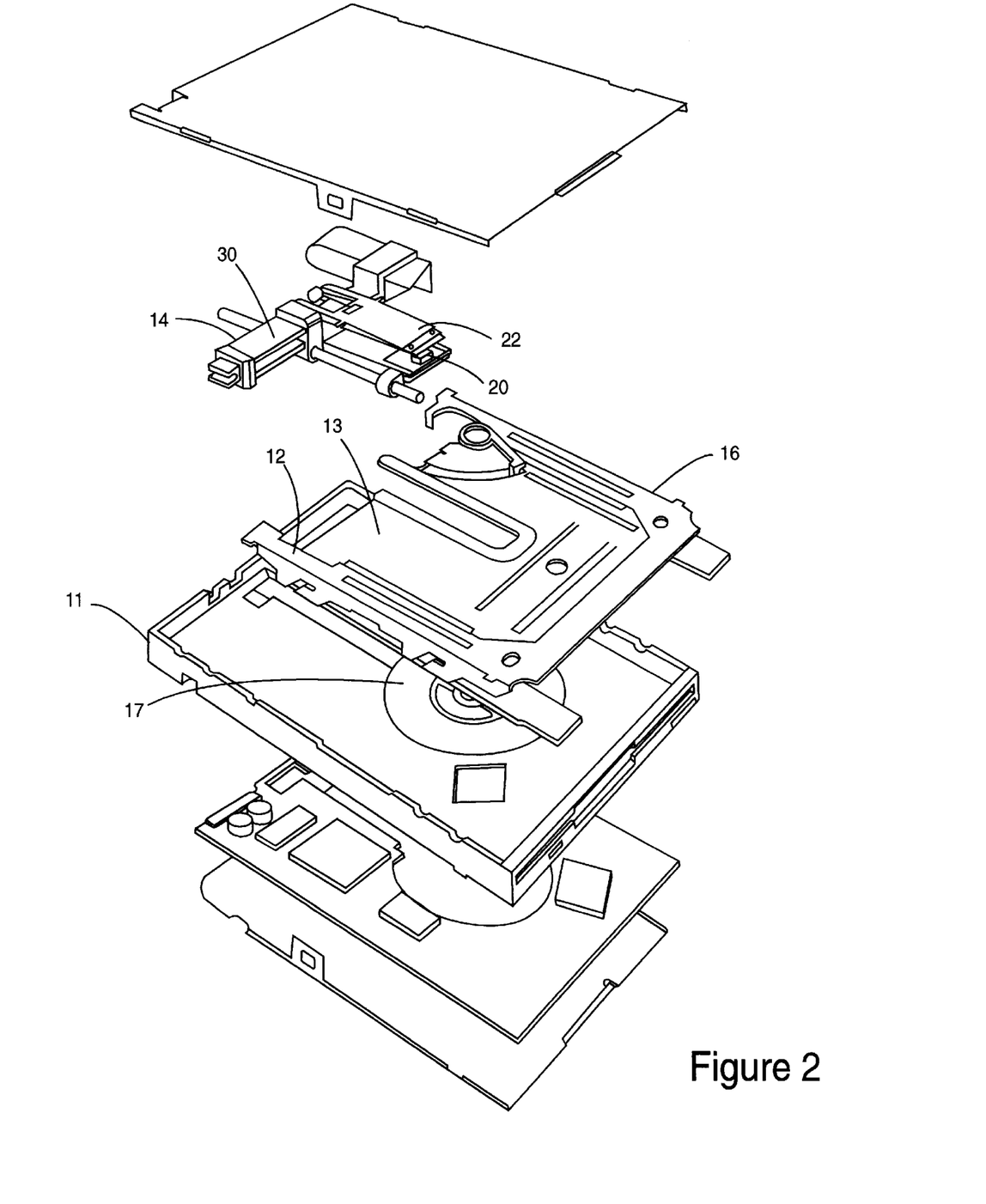
FIG. 2 is an exploded partial view of the disk drive assembly of FIG. 1, showing major component subassemblies.

As shown in FIG. 2, the disk drive 10 comprises a chassis 11, a load/unload assembly 16, and an actuator 14. The load/unload assembly 16 is further comprised of an eject frame 12, shown in FIG. 3, and a receiver element 13, shown enlarged in FIG. 4. The actuator 14 is a subassembly comprised of a cantilever arm 22, a positioning motor 30, an upper head 19 and lower head 20. FIG. 2 is intended to provide a general overview of particular subsystems in a disk drive, but does not show certain elements of the present invention.

The eject frame 12 is movably mounted within the chassis 11 to slide the load/unload assembly 16 toward and away from the front panel 42 of the disk drive 10. The receiver element 13, shown in FIG. 2, functions to guide a diskette 18 into position above a spindle motor 17 and past the heads 19 and 20. Once in position, the receiver element 13 is movable with respect to the eject frame 12 and the chassis 11 to clamp the diskette 18 onto the spindle motor 17 using locating features on the chassis 11.

Figure 4:
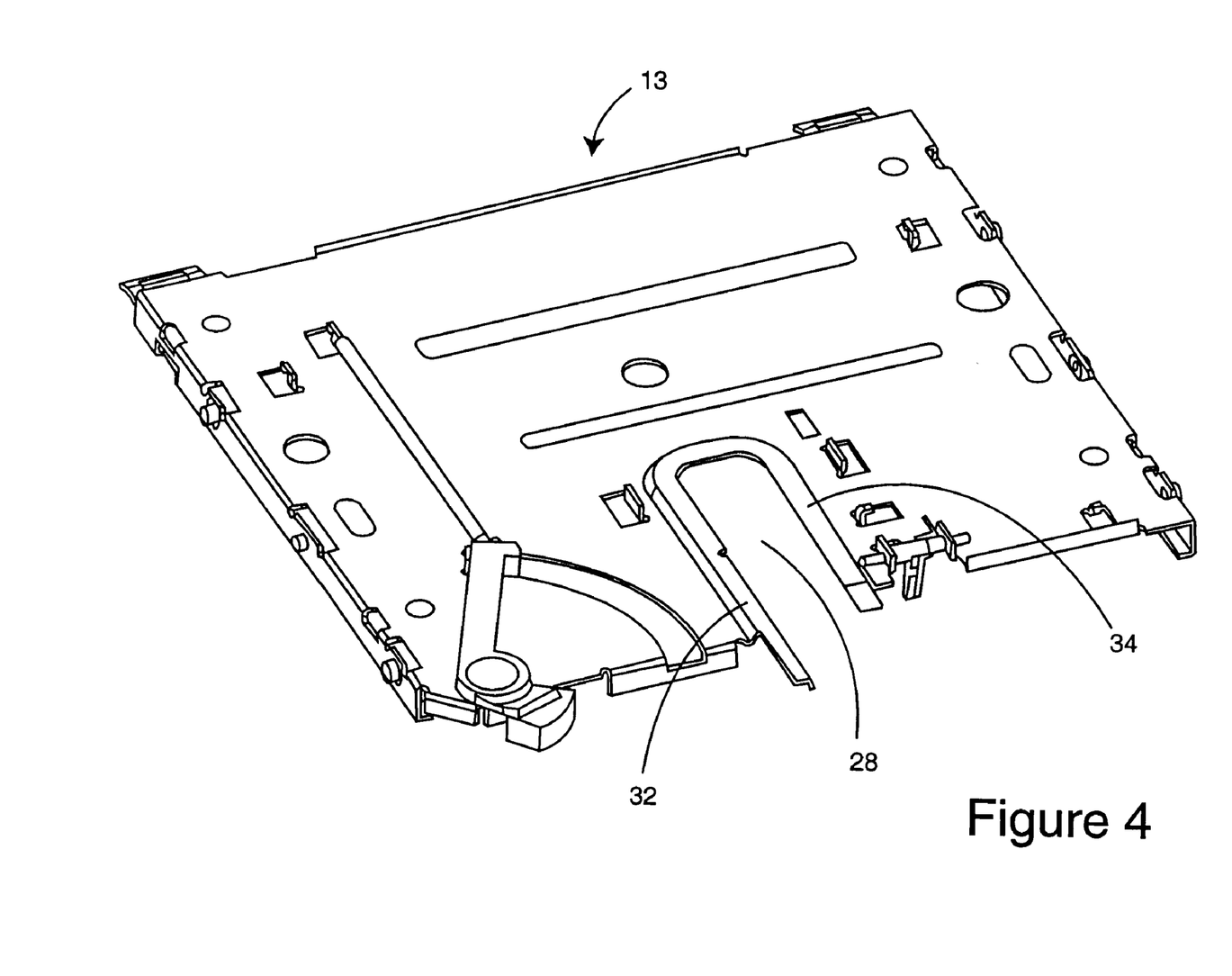
FIG. 4 is a perspective view of a receiver element according to the present invention.

As shown in FIG. 4, the receiver element has a slot 28 that exposes a recording medium on the diskette 18. A first rail 32 is located along one edge of the slot 28, and a second rail 34 is located along the opposing edge of the slot 28.

Figure 5:
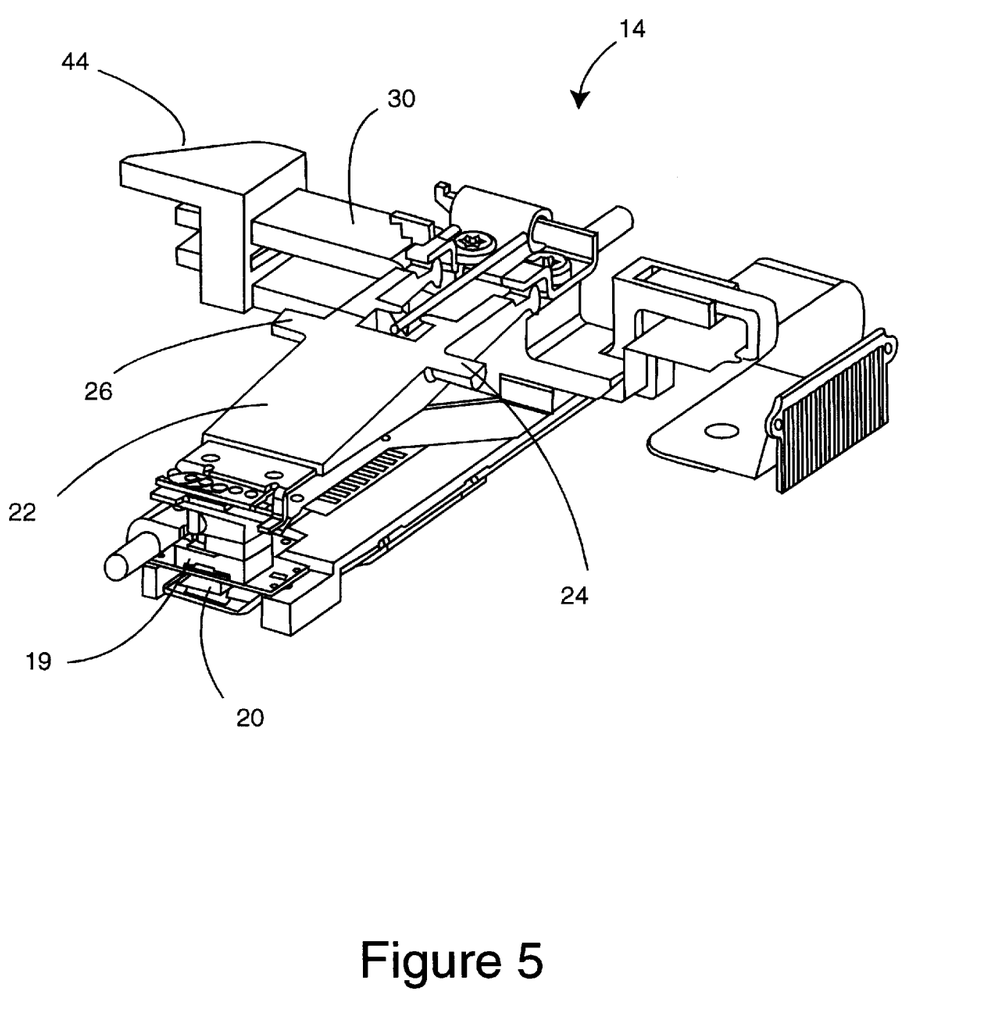
FIG. 5 is a perspective view of an actuator according to the present invention.

An actuator 14 is shown enlarged in FIG. 5. The actuator 14 is an assembly comprising an upper head 19 and a lower head 20. In the preferred embodiment, the upper head 19 is supported by a cantilever arm 22. First and second wings, 24 and 26, extend from the cantilever arm 22.

The actuator 14 is linearly movable with respect to the chassis 11 so that it can position the heads 19 and 20 along the slot 28. A coil portion of a positioning motor is shown as element 30 in FIG. 5, although for convenience the entire positioning motor will be referenced as element 30. Permanent magnets are typically part of a positioning motor, but are not shown in FIG. 5 for clarity.

The positioning motor 30 is preferably a voice coil motor, and is used to move the actuator 14. The range of motion for the actuator 14 is called the stroke, and a particular location of the actuator 14 may be called a stroke position. The stroke is preferably large enough to position the heads 19 and 20 anywhere from the outer diameter 56 of the diskette 18 to the inner diameter 54 of the diskette 18.

During read/write operation of the disk drive, the receiver element 13 clamps the diskette 18 against the chassis 11. As the disk within the diskette 18 rotates, the actuator 14 moves linearly along the slot 28 to position the heads 19 and 20. The wings 24 and 26 do not contact the first and second rails 32 and 34 during read/write operation.

The receiver element 13 must be lifted to allow the diskette 18 to be ejected. The upward motion of the receiver element will also raise the first and second rails 32 and 34 to engage the wings 24 and 26. Thus, the upward motion will also lift the cantilever arm 22 to which the upper head 19 is attached. This motion results in safely lifting the upper head 19 away from the diskette 18. The receiver element 13 remains in the uplifted position until a diskette 18 is inserted into the disk drive 10.

In certain embodiments of the invention, the second rail 34 cannot extend as far as the first rail 32 due to mechanical interference with a voice coil motor 30. In these embodiments, there is a portion of the stroke near the outer diameter 56 wherein lifting the receiver element 13 will result in only one wing 24 being supported by a rail 32. In this configuration, ejecting the diskette 18 may cause damage to the heads 19 and 20. A torque will be applied to the cantilever arm 22 when only the first wing 24 is lifted by the first rail 32. This may cause the upper head 19 to remain in contact with the disk cartridge or shutter as the diskette 18 is withdrawn. The heads 19 and 20 are delicate instruments, and could be permanently damaged by such contact. Thus, it is necessary to position the actuator 14 toward the inner diameter 54 of the diskette 18 before ejecting the diskette 18 such that both wings 24 and 26 are supported by rails 32 and 34.

The flexibility of the receiver element 13 presents a potential hazard to the heads 19 and 20. In the absence of a diskette 18 installed in the disk drive, the receiver element 13 functions to separate the heads 19 and 20. The rails 32 and 34 support the cantilever arm 22 to hold the upper head 19 away from the lower head 20. A mechanical shock to the disk drive 10, such as bumping or dropping the disk drive 10, could cause the receiver element 13 to flex. A large flexural motion could potentially result in a collision of the heads 19 and 20. To reduce the possibility of this occurrence, it is advantageous to position the actuator 14 near the inner diameter 54 where the receiver element 13 has more structural rigidity and where the flexural motion is likely to be reduced.

During normal operations, the disk drive 10 can be controlled by software, also known as firmware, to insure the proper position of the actuator 14 prior to ejection. A software command can cause the voice coil motor 30 to drive the actuator 14 to the inner radius of the diskette 18, and thereafter actuate the eject frame 12 and receiver element 13.

A potential problem arises when power to the disk drive 10 is interrupted by low battery power, or power failure, or turning off the computer in which the disk drive 10 is installed. It is desirable to have a mechanism to remove a diskette 18 under a power-off condition. However, during such a power-off condition, there is typically no way to use the voice coil motor 30 to position the actuator 14. Thus a mechanical system is desired that will insure the proper position of the actuator 14 prior to ejecting a diskette 18.

Figure 3:
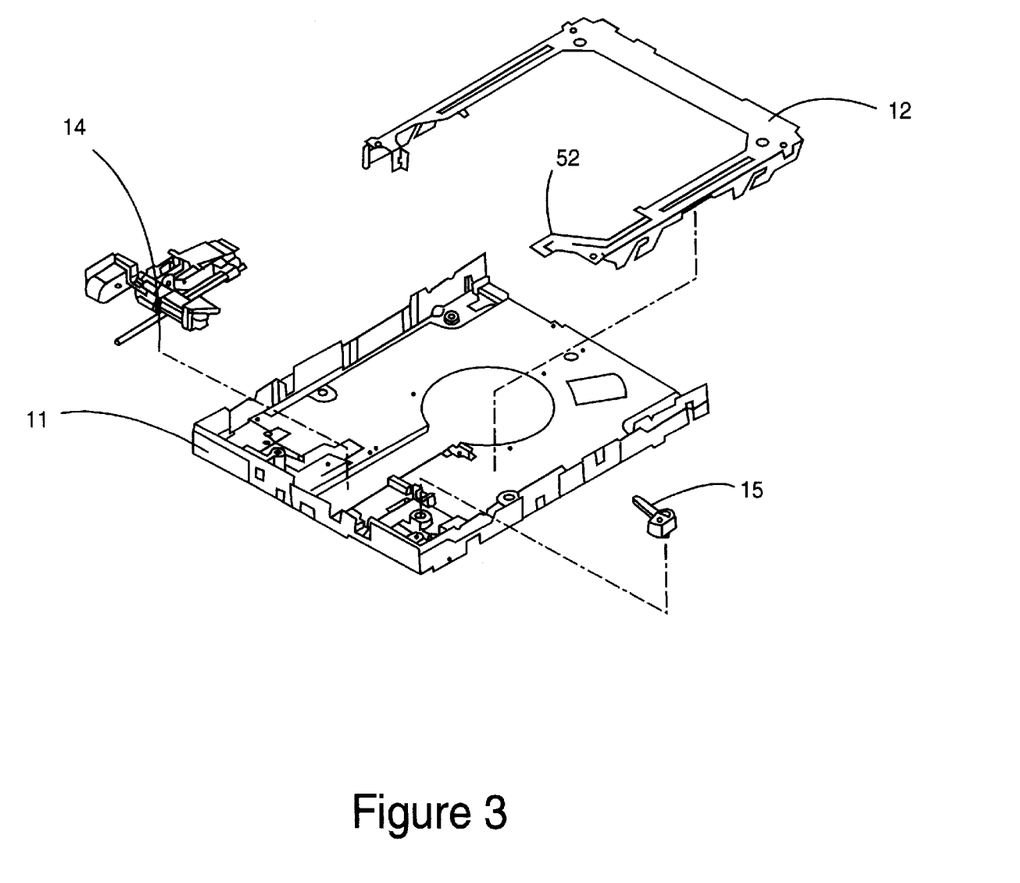
FIG. 3 is an exploded partial view of the disk drive assembly of FIG. 1, showing the eject frame, chassis, actuator, and latch.
Figure 6:
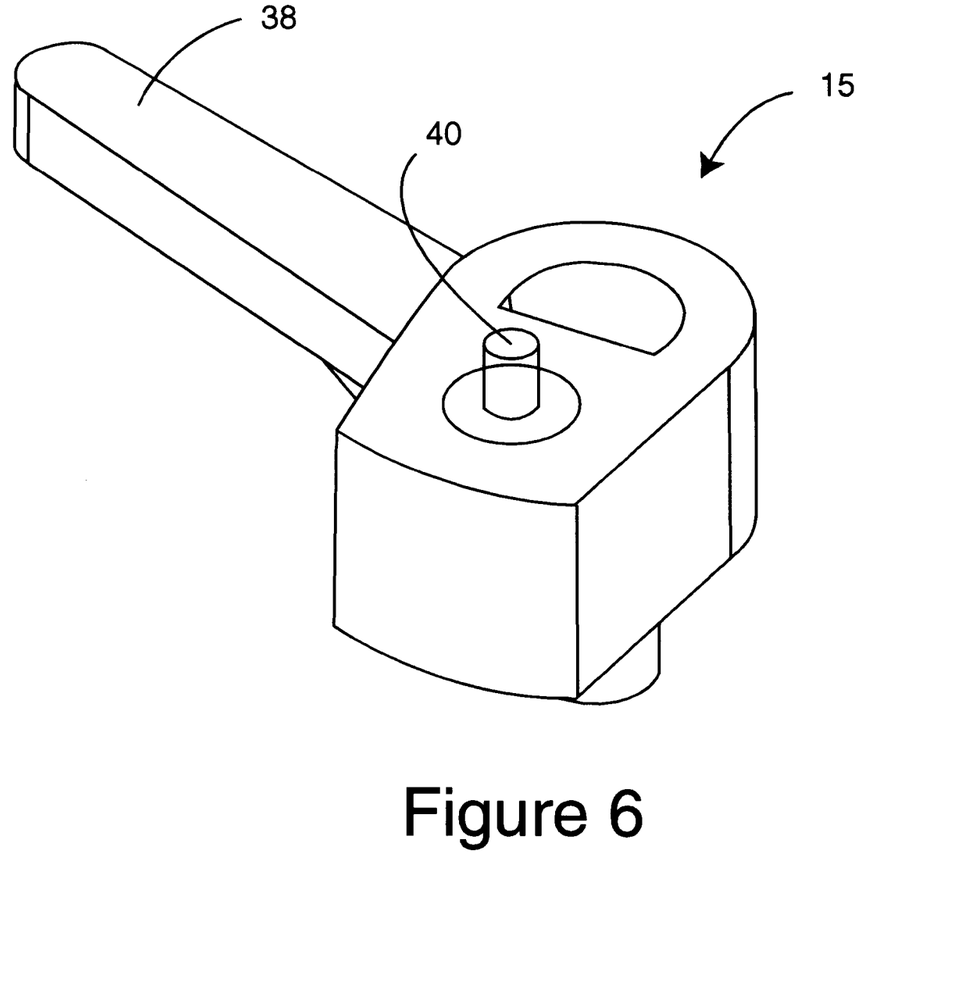
FIG. 6 is an enlarged view of a movable latch according to the present invention.

A movable latch 15 is shown in the exploded view of FIG. 3, and is also shown in greater detail in FIG. 6. In the preferred embodiment, the movable latch 15 is mounted to the chassis 11 on a pivot. The eject frame 12 is mechanically linked to the movable latch 15 by attachment to a latch pin 40. The latch pin 40 is offset from the axis of the pivot, so that a force against the latch pin 40 will create a moment about the pivot. A latch arm 38 is rigidly attached to the movable latch 15. Rotational motion of the movable latch 15 will swing the latch arm 38 in an arcuate path.

A surface on the actuator 14 is shaped to engage the latch 15, and is herein designated the actuator surface 44 and shown in FIG. 5. The shape and position of the actuator surface 44 is preferably designed such that the latch arm 38 can reach the actuator surface 44, at any stroke position, as the latch moves in its arcuate path. If electrical power to the disk drive 10 is terminated, it should be possible to engage the actuator 14 with the latch arm 38 and position the actuator 14 at the desired park location.

In the preferred embodiment, the movable latch 15 is free to move through its arcuate motion without a spring bias. The advantage of this design is that insertion of a diskette 18 does not require any additional force to overcome the spring bias. There are small additional forces associated with the latch 15 due to friction and the interaction of a cam/follower mechanism, as described below.

Referring back to FIG. 3 the eject frame 12 has a slot 52 that mates with the latch pin 40 on the movable latch 15. The eject frame slot 52 is shaped such that motion of the eject frame 12 causes the eject frame slot 52 to drive the pin 40 to thereby move the latch 15. This type of linkage is equivalent, in certain respects, to a cam-follower interaction. An equivalent arrangement is to reverse the placement of the pin and the slot, such that the pin is on the eject frame and the slot is on the latch. In the preferred embodiment, the slot 52 is designed with overtravel protection. The overtravel protection consists of an extension in the slot 52 that provides strain relief for the pin in the event that tolerances within the mechanical components would have otherwise driven the pin 40 against the end of the slot 52.

As normally operated, depressing an eject button on the front panel of the disk drive 10 will cause execution of firmware that commands the actuator 14 to the inner diameter 54 of the disk. After the actuator 14 is safely in position, the firmware commands the eject motor 36 to drive the eject frame 12. Since the eject frame 12 is linked to the movable latch 15, the latch arm 38 will swing, but there will be no contact with the actuator surface 44 because the actuator 14 is already in its parked position. Thus, the eject motor 36 does not have to bear the load of moving the actuator 14. A small additional load will be added to the eject motor 36 due to the inertia of the movable latch 15 and the friction in the cam/follower linkage.

If electrical power is not available to the disk drive 10, an access port 50 in the front panel 42 can be used to manually push the eject frame 12. The latch arm 38 will swing against the actuator surface 44 to push the actuator 14 into position. There is typically no way to predict the location of the actuator 14 when power is disrupted. Therefore, the latch arm 38 should be capable of engaging the actuator surface 44 at any position along the stroke.

Figure 7:
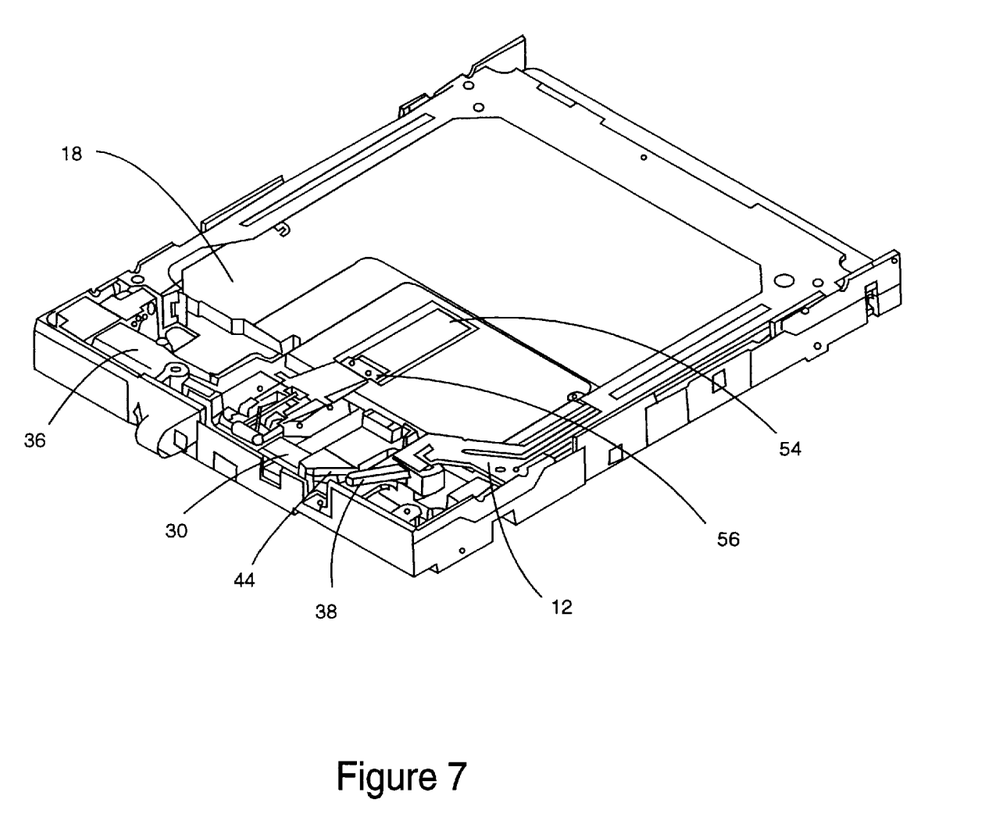
FIG. 7 is a view, in perspective, of a portion of a disk drive assembly with a diskette installed, wherein the receiver element is removed, and wherein the actuator is shown in the outer diameter position.
Figure 8:
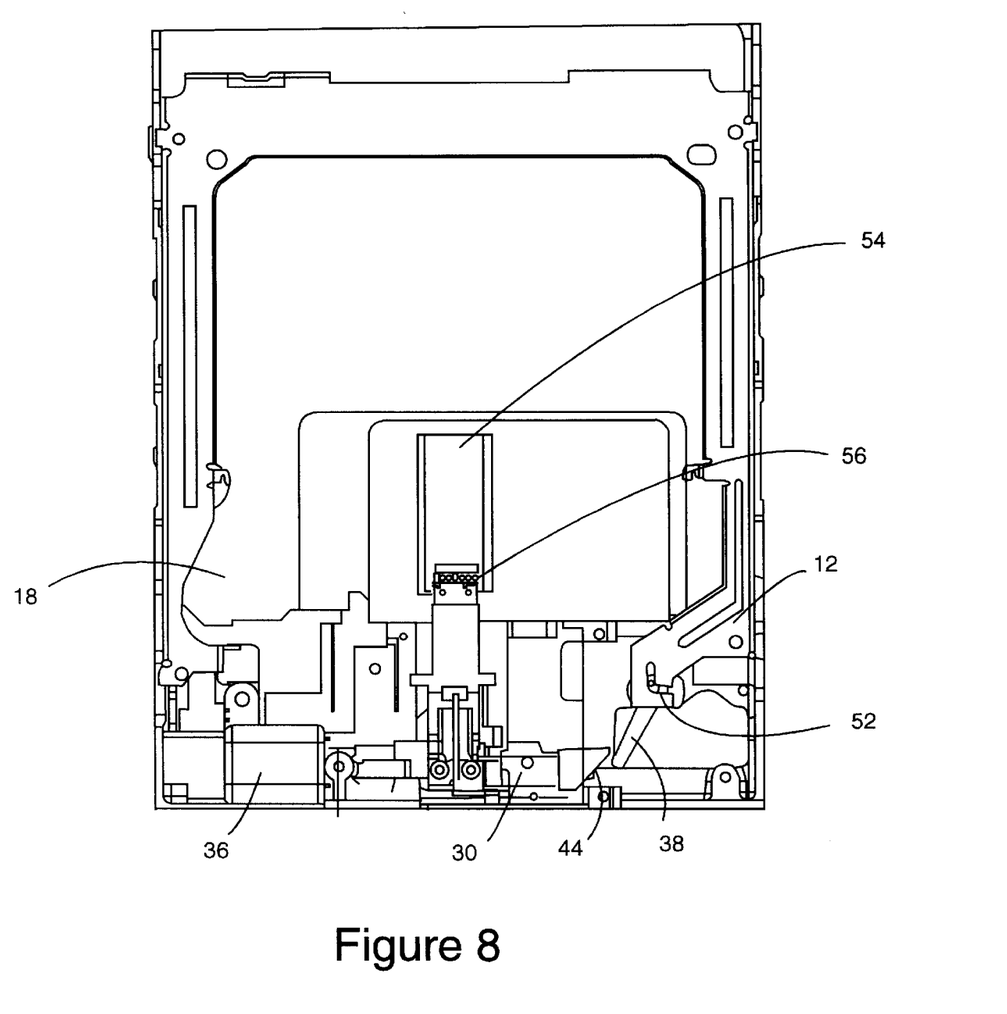
FIG. 8 is a top view of FIG. 7.

The process of manually ejecting a diskette 18 can be further understood with reference to FIGS. 7 through 10. FIG. 7 shows the disk drive 10 with the receiver element 13 removed for clarity. A diskette 18 is shown installed in the disk drive 10. The actuator 14 is shown in the outer diameter position 56. The voice coil motor 30 is capable of driving the actuator to any position along the stroke without interacting with the latch arm 38. FIG. 8 is a top view of FIG. 7, and shows the latch arm 38 in a retracted position with respect to the actuator surface 44.

Figure 9:
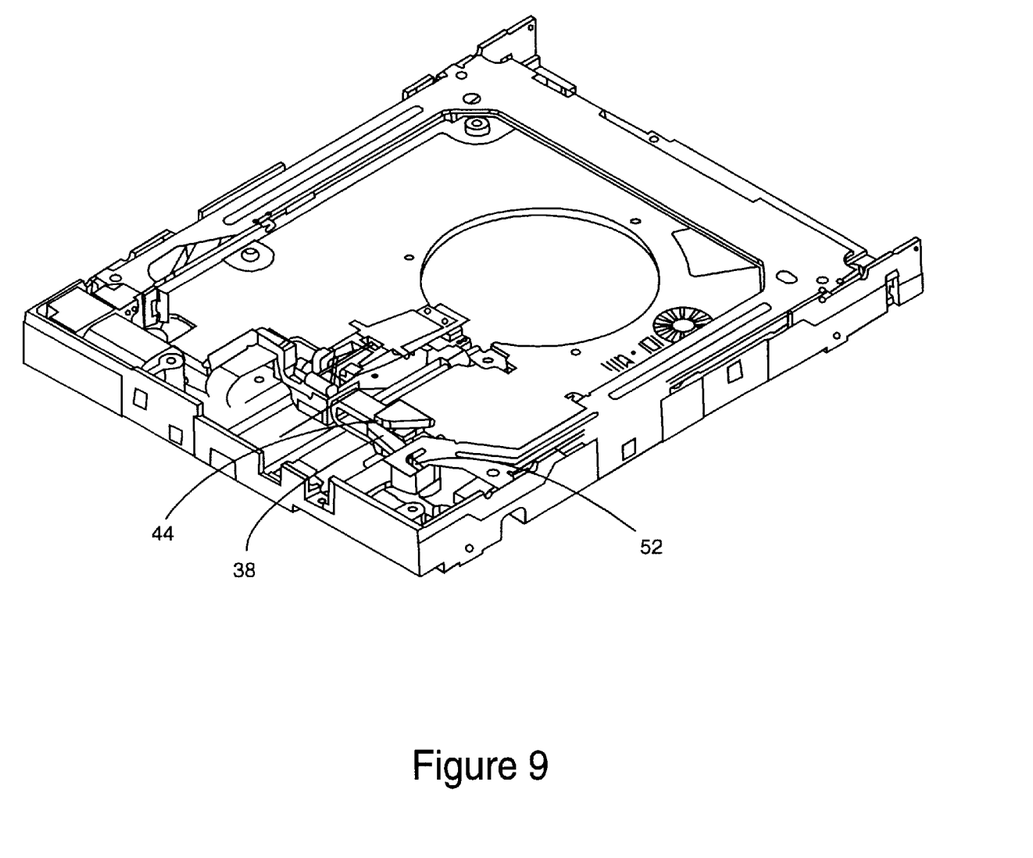
FIG. 9 is a view, in perspective, of a portion of a disk drive assembly without a diskette. wherein the receiver element is removed. and wherein the actuator is shown in the inner diameter position.
Figure 10:
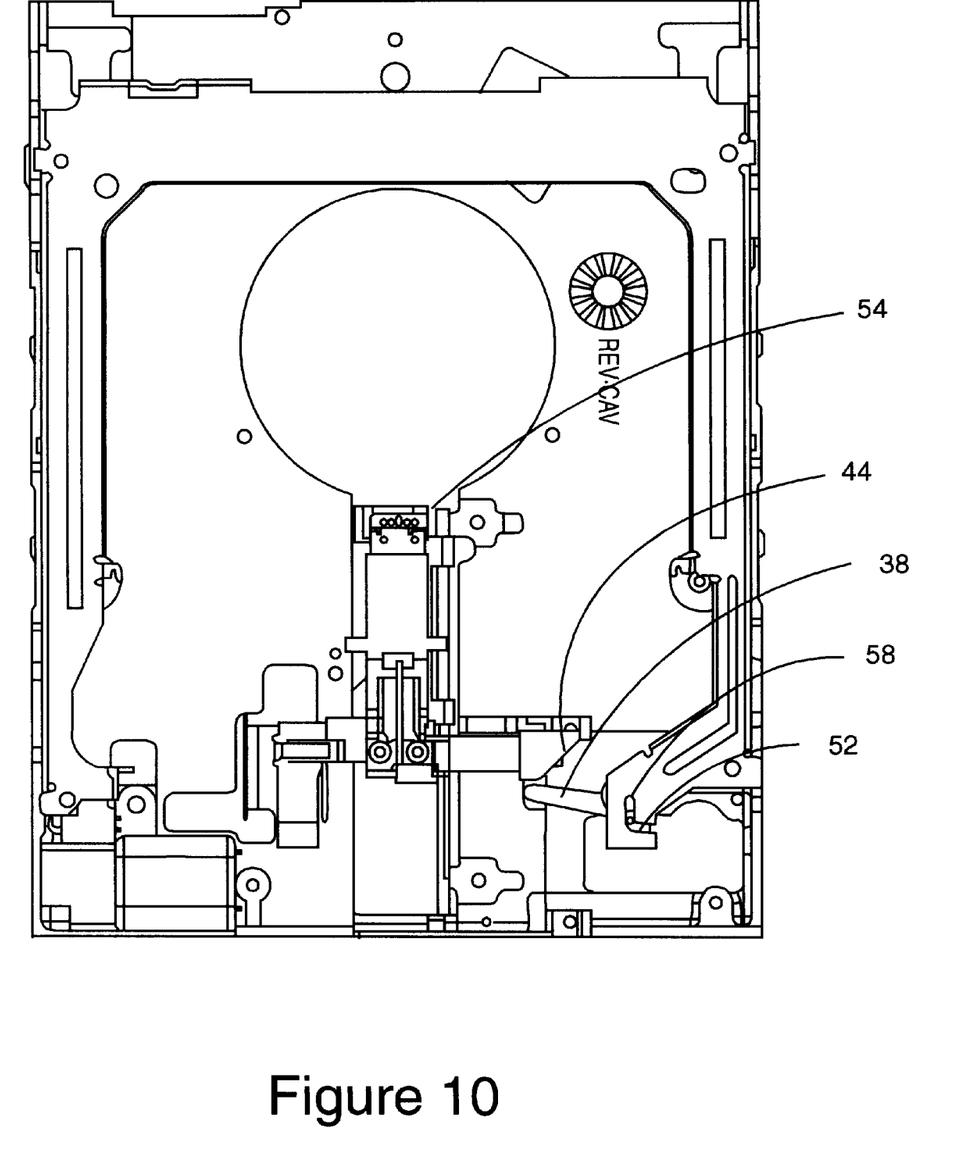
FIG. 10 is a top view of FIG. 9.

FIG. 9 shows the actuator 14 in the parked position at the inner diameter position 54. As in FIGS. 7 and 8, the receiver element 13 has been removed for clarity. The diskette 18 is also shown removed in FIGS. 9 and 10. A comparison of FIGS. 8 and 10 shows the range of motion of the latch arm 38. FIG. 10 shows the latch arm 38 in its extended position. The actuator 14 is shown captured, and parked, by the position of the latch arm 38. FIG. 10 also shows the eject frame slot 52 has an overtravel extension 58, which is a continuation of the slot 52 to ensure that the cam-follower linkage does not bind.

A method of parking heads 19 and 20 on a disk drive 10 is disclosed. The method comprises the following steps: sliding an eject frame 12 relative to a chassis 11 in a linear motion; converting the linear motion of the eject frame 12 into rotary motion of a latch 15; engaging a latch engagement surface 44 on the actuator 15 with the latch 15; and parking the heads 19 and 20 by moving the actuator 15 according to the engagement of the latch engagement surface 44 and the latch 15.

It will be apparent to those of skill in the appertaining arts that various modifications can be made within the scope of the above invention. Accordingly, this invention is not to be considered limited to the specific examples chosen for purposes of disclosure, but rather to cover all changes and modifications which do not constitute departures from the permissible scope of the present invention. Having thus described our invention, what is desired to be secured and covered by Letters Patent is presented in the appended claims.

We claim:

1. A disk drive apparatus comprising:

a chassis supporting a spindle motor for rotating a disk loaded into the disk drive, an eject frame slidably mounted to the chassis;

a receiver element movably mounted on the elect frame, the receiver element having an engaged position for clamping the disk against the chassis;

an actuator movably mounted to the chassis, said actuator including a latch engagement surface;

a movable latch coupled to the elect frame and capable of engaging the latch engagement surface;

first and second rails on the receiver element; and a cantilever arm attached to the actuator, the cantilever arm having first and second wings that are capable of being supported on the first and second rails, respectively, whereby the latch is shaped to engage the latch engagement surface to position the first and second wings on the first and second rails, respectively, thus separating the heads and latching the actuator in a parked position.

2. The apparatus according to claim 1, wherein the first and second rails are of unequal length and cannot both engage said first and second wings at a portion of the possible stroke positions of the actuator.

3. A method of parking a head on a disk drive having a head attached to an actuator that is movable within the disk drive, the method comprising the steps of:

sliding an eject frame and receiver relative to a chassis in a linear direction in response to a manually applied diskette-ejection force;

converting a linear motion of said eject frame into a motion that rotates a pivoting latch; and sweeping an arm attached to said pivoting latch to press up against an actuator and retract an attached pair of heads to a parked and unloaded position;

wherein, the step of sweeping is such that the receiver includes a pair of first and second rails, and the actuator has a cantilever arm with lift wings, the method further comprising a step of engaging the lift wings with the first and second rails to unload said pair of heads.

4. An improved removable-media disk drive having a chassis, a load/unload assembly mounted to the chassis that includes an eject frame and a receiver to clamp a diskette against the chassis, and an actuator assembly also mounted to the chassis that includes a pair of opposing transducers for accessing a data storage media of the diskette, the improvement comprising:

a pair of lift-wing extensions on the actuator assembly that engage the eject frame and provide for loading and unloading of the transducers during any insertion and ejection of the diskette; and a pivoting latch mechanically disposed between the actuator and eject frame such that any forcing of the eject frame to slide back on the chassis will be mechanically translated to cause the actuator to fully retract and lock into a parked position and that then causes the pair of lift-wing extensions to be risen by the receiver and unload the transducers;

wherein said transducers are protected from mechanical injury if the diskette is manually ejected.

5. The improved disk drive of claim 4, wherein:

the pivoting latch is not biased by a spring that would otherwise increase the force necessary to insert the diskette.

6. The improved disk drive of claim 4, wherein:

the pivoting latch has a lever arm that can engage and retract the actuator at any stroke position.

* * * * *